United States Patent
Kuehne

(10) Patent No.: US 9,933,912 B2
(45) Date of Patent: Apr. 3, 2018

(54) METHOD FOR OPERATING VIRTUAL REALITY SPECTACLES, AND SYSTEM HAVING VIRTUAL REALITY SPECTACLES

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 193 days.

(21) Appl. No.: 14/743,204

(22) Filed: Jun. 18, 2015

(65) Prior Publication Data

US 2015/0371446 A1 Dec. 24, 2015

(30) Foreign Application Priority Data

Jun. 26, 2014 (DE) .................... 10 2014 009 299

(51) Int. Cl.
*G06F 3/0481* (2013.01)
*G02B 27/01* (2006.01)
*G06F 3/01* (2006.01)

(52) U.S. Cl.
CPC ....... *G06F 3/04815* (2013.01); *G02B 27/017* (2013.01); *G02B 27/0172* (2013.01); *G06F 3/011* (2013.01); *G02B 2027/014* (2013.01); *G02B 2027/0178* (2013.01); *G02B 2027/0187* (2013.01)

(58) Field of Classification Search
CPC ... G02B 27/0172; G02B 27/017; G06F 3/011; G06F 3/04815
See application file for complete search history.

(56) References Cited

U.S. PATENT DOCUMENTS

| 7,928,926 B2 | 4/2011 | Yamamoto et al. |
| 2001/0015718 A1* | 8/2001 | Hinckley ................ A63F 13/06 345/156 |
| 2007/0146390 A1 | 6/2007 | Noro et al. |

(Continued)

FOREIGN PATENT DOCUMENTS

DE   10 2014 009 299.2   6/2014

OTHER PUBLICATIONS

German Office Action for German Priority Patent Application No. 10 2014 009 299.2, dated Mar. 6, 2015, 9 pages.

(Continued)

*Primary Examiner* — Jwalant Amin
(74) *Attorney, Agent, or Firm* — Staas & Halsey LLP

(57) ABSTRACT

A method for operating virtual reality spectacles, having the steps of: display of at least one virtual object, arranged in virtual surroundings, by means of the virtual reality spectacles from a first observation position that is prescribed within the virtual surroundings; display of at least one position symbol at a position within the virtual surroundings that corresponds to a second observation position prescribed within the virtual surroundings; identification of a virtual standard line of vision to the virtual object from the second observation position; selection of the displayed position symbol as soon as a predetermined selection action has been sensed; and display of the virtual object from the second observation position as soon as a predetermined confirmation action for the selected position symbol has been sensed. Furthermore, the invention relates to a system having virtual reality spectacles.

24 Claims, 4 Drawing Sheets

(56) References Cited

U.S. PATENT DOCUMENTS

| | | | |
|---|---|---|---|
| 2007/0296646 A1* | 12/2007 | Yamamoto | G02B 27/017 345/8 |
| 2011/0175932 A1 | 7/2011 | Yu et al. | |
| 2012/0081365 A1* | 4/2012 | Nakagawa | G06F 3/04815 345/419 |
| 2013/0300740 A1* | 11/2013 | Snyder | G06F 3/016 345/420 |
| 2015/0007114 A1* | 1/2015 | Poulos | G06F 3/012 715/852 |

OTHER PUBLICATIONS

Paul Grimm et al., "Virtual and Augmented Reality (VR/AR)," Berlin Heidelberg: Springer, 2013, pp. 122-123 and 151-153 Machine.

* cited by examiner

METHOD FOR OPERATING VIRTUAL REALITY SPECTACLES, AND SYSTEM HAVING VIRTUAL REALITY SPECTACLES

CROSS REFERENCE TO RELATED APPLICATIONS

This application is based on and hereby claims priority to German Application No. 10 2014 009 299.2 filed on Jun. 26, 2014, the contents of which are hereby incorporated by reference.

BACKGROUND

The invention relates to a method for operating virtual reality spectacles and to a system having virtual reality spectacles.

Virtual reality spectacles are a particular form of what is known as a head mounted display, which is a visual output appliance worn on the head. Said output appliance presents images on a screen close to the eyes or projects them directly onto the retina. In this case, virtual reality spectacles additionally have sensors for sensing the movement of the head. This allows the display of the computed graphics to be matched to the movements of the wearer of the spectacles. The physical proximity means that the displayed image areas from head mounted displays have the effect of being substantially larger than the freestanding screens and, in extreme cases, even cover the entire field of view of the user. Since the display follows all head movements by the wearer as a result of the posture of the head, the user is provided with the feeling of moving directly in an image landscape generated by a computer.

Virtual reality spectacles of this kind can thus be used to present a virtual reality, virtual reality usually denoting the presentation and simultaneous perception of reality in its physical properties in interactive virtual surroundings that are computer-generated in real time.

In virtual reality surroundings, a particular challenge is to provide a suitable opportunity for interaction in order to determine or to alter the virtual position of the wearer of such spectacles in relation to an object presented by the virtual reality spectacles. Free movements within the presented virtual reality, in particular, for example brought about by a controller or joystick, can quickly lead to nausea in the wearer of virtual reality spectacles, since during the virtual movement an inconsistency arises between the visual impressions and the lack of movement feedback from the vestibular system in the inner ear.

Furthermore, it is sometimes difficult for a wearer of virtual reality spectacles to be able to gauge how his line of vision to a displayed virtual object alters if he alters his observation position within the virtual surroundings.

SUMMARY

It is therefore one possible object to provide a method for operating virtual reality spectacles and a system having virtual reality spectacles that allow improved alteration of the virtual position of a wearer of the spectacles within virtual surroundings displayed by the virtual reality spectacles.

The inventors propose a method for operating virtual reality spectacles, at least one virtual object arranged in virtual surroundings is displayed by the virtual reality spectacles from a first observation position prescribed within the virtual surroundings. Furthermore, at least one position symbol is displayed at a position within the virtual surroundings that corresponds to a second observation position prescribed within the virtual surroundings. In addition, a virtual standard line of vision to the virtual object from the second observation position is identified. The displayed position symbol is selected as soon as a predetermined selection action has been sensed. Furthermore, the virtual object is displayed from the second observation position as soon as a predetermined confirmation action for the selected position symbol has been sensed.

In other words, the proposed method thus provides for a wearer of virtual reality spectacles to be able to move, particularly to be able to skip, from a prescribed observation position to another observation position within the virtual surroundings by selecting an appropriately displayed position symbol and confirming the selection thereof. In this case, one or more possible skip positions can be displayed to him in the form of the displayed position symbol or further position symbols in their physically correct position within the virtual surroundings. In other words, the prescribed observation positions are thus virtual viewpoints at which the wearer of the virtual reality spectacles is situated virtually within the displayed virtual surroundings, the virtual reality spectacles or the display device thereof being actuated such that the wearer of the virtual reality spectacles is provided with the impression that he is currently looking at the virtual object from the correspondingly prescribed observation position.

The problem mentioned at the outset that can arise with free movements within a virtual reality is remedied by the proposed solution since the wearer of the virtual reality spectacles no longer moves freely within the displayed virtual surroundings according to his visual perception. Instead, the wearer of the virtual reality spectacles can use the method to skip from one virtual observation position to the next and hence alter his virtual viewpoint within the displayed virtual surroundings in fits and starts and hence to alter the perspective on the currently displayed virtual object likewise by leaps and bounds. This prevents any inconsistency from arising between the visual impressions and the actually provided movement feedback from the vestibular system of the wearer of the virtual reality spectacles, which means that it is possible to prevent the occurrence of nausea in a wearer of the virtual reality spectacles.

The solution also tells a user wearing the virtual reality spectacles, on the basis of the identification of the standard line of vision, which starts from the second observation position, even before the virtual change of position is activated or confirmed, the position that he is in after the change of position and how he will look at the virtual object from this new virtual observation position.

In one advantageous refinement, the displayed position symbol is selected as soon as the predetermined selection action that has been sensed is that a selection symbol displayed within the virtual surroundings has been made to at least partially overlap the displayed position symbol. The movement of the selection symbol can be controlled by the wearer of the virtual reality spectacles as appropriate, which allows him to prompt selection of the displayed position symbol in a particularly simple and convenient manner. By way of example, the displayed selection symbol, which is also intended to be understood as a selective symbol, may be a crosshair, a mouse pointer or the like.

In a further advantageous refinement, the selection symbol is moved on the basis of a sensed head movement by a wearer of the virtual reality spectacles within the virtual surroundings. By way of example, the virtual reality spectacles may have a combination of a three-axis gyrometer and acceleration sensors that can be used to reliably sense the head movement of the wearer of the virtual reality spectacles. Since the selection symbol is moved on the basis of the sensed head movement of the wearer within the virtual surroundings, the selection symbol can be moved in a particularly simple and convenient manner by the wearer of the virtual reality spectacles within the virtual surroundings.

According to a further advantageous embodiment, the selection symbol is moved on the basis of a sensed eye movement by the wearer of the virtual reality spectacles within the virtual surroundings. For this, the virtual reality spectacles can have a sensing device, for example, that is designed to sense eye movements, particularly the line of vision of the wearer of the virtual reality spectacles. Eye-movement-controlled movement of the selection symbol within the virtual surroundings gives rise to the particular advantage that the selection symbol can be moved particularly quickly and easily. In this case, the selection symbol can also be moved either on the basis of the sensed head movement or on the basis of the sensed eye movement of the wearer of the virtual reality spectacles. This results in a particularly convenient and intuitive control option for the selection symbol for the wearer of the virtual reality spectacles. This is because the wearer of the virtual reality spectacles simply needs to just look at the position symbol in question that is displayed to him in the virtual surroundings in order to select the position symbol.

In a further advantageous refinement, the virtual standard line of vision to the virtual object from the second observation position is identified by virtue of the selection symbol having a direction sign that is oriented from the second observation position to the virtual object as soon as the selection symbol has been made to at least partially overlap the displayed position symbol. By way of example, the direction sign can be displayed in the form of an arrowhead, an arrow, a triangle or the like, so that the wearer of the virtual reality spectacles can easily recognize the line of vision from the second observation position with which he will look at the displayed virtual object after a certain change of position.

According to a further alternative advantageous embodiment, the standard line of vision to the virtual object from the second observation position is identified by virtue of the position symbol having a direction sign that is oriented from the second observation position to the virtual object. This likewise allows a wearer of the virtual reality spectacles to easily be able to recognize the line of vision with which he will look at the virtual object from the second observation position as soon as he has changed position from the first to the second observation position.

In this case, provision may be made for the direction sign to be displayed only when the position symbol has been selected. As a result, the wearer of the virtual reality spectacles is additionally provided with the information that he has currently selected the position symbol. Alternatively, it is also possible for the direction sign always to be displayed together with the position symbol. In this case, the advantage is that as soon as the position symbol is displayed, the user is also always provided with a display of how he will look at the displayed virtual object after a change of position from the first to the second observation position.

In a further advantageous refinement, the virtual standard line of vision to the virtual object from the second observation position is identified in a plane defined by the longitudinal direction and the transverse direction of the virtual surroundings. In other words, a wearer of the virtual reality spectacles is thus provided with a piece of two-dimensional direction information when the standard line of vision is identified.

In a further advantageous embodiment, the respective virtual angle of vision from which the virtual object is displayed from the respective observation positions is altered on the basis of a sensed swiveled position of the head of the wearer of the virtual reality spectacles. By swiveling his head up or down or left or right, the user can thus alter his respective virtual angle of vision with respect to the currently displayed virtual object. This results in particularly simple control of the virtual reality spectacles, which alters the angle of vision with respect to the currently displayed virtual object subsequent to the swivel movement of the head of the wearer as appropriate.

According to a further advantageous embodiment, the virtual line of vision and the virtual standard line of vision match if the sensed swiveled position of the head corresponds to a prescribed standard swiveled position. By way of example, the procedure may thus be that the wearer of the virtual reality spectacles first of all performs a kind of calibration operation by moving his head, after putting on the virtual reality spectacles, into the head posture that corresponds to his standard head posture. This standard head posture is then stored as the standard swiveled position. If, following a sudden change of position from the first to the second observation position, the wearer of the virtual reality spectacles adopts this standard orientation of his head again, then the currently displayed virtual line of vision corresponds to the virtual standard line of vision marked previously.

Preferably, the virtual object displayed is a motor vehicle, with the position symbol being arranged and displayed outside or inside the motor vehicle. The wearer of the virtual reality spectacles can therefore skip from one virtual observation position to the next and look at the virtual motor vehicle from a wide variety of different perspectives. In so doing, he can also skip to a virtual observation position inside the motor vehicle in order to be able to display the interior from the driver's seat or else from other seat positions inside the motor vehicle, for example. This means that, at sales sites or showrooms for motor vehicles, for example, it is no longer necessary to keep a diverse array of different motor vehicle variants with a wide variety of special equipment, since a potential customer can particularly easily use the virtual reality spectacles to display vehicle variants with a wide variety of equipment inside and outside and for a wide variety of angles of vision.

The system comprises virtual reality spectacles that are designed to display at least one virtual object arranged in virtual surroundings from a first observation position that is prescribed within the virtual surroundings. Furthermore, the virtual reality spectacles are designed to display at least one position symbol within the virtual surroundings at a position within the virtual surroundings that corresponds to a second observation position that is prescribed within the virtual surroundings. In addition, the virtual reality spectacles are designed to identify a standard line of vision to the virtual object from the second observation position. The system additionally comprises a control device that is designed to select the displayed position symbol as soon as a predetermined selection action has been sensed. Furthermore, the control device is designed to actuate the virtual reality spectacles such that the virtual object is displayed from the second observation position as soon as a predetermined confirmation action for the selected position symbol has been sensed. Advantageous refinements of the method can be regarded as advantageous refinements of the system, the system carries out the method.

Further advantages, features and details will become evident from the description that follows for preferred exemplary embodiments and with reference to the drawings. The features and combinations of features cited in the description above and the features and combinations of features shown in the description of the figures below and/or in the figures alone can be used not only in the respectively indicated combination but also in other combinations or on their own without departing from the scope.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
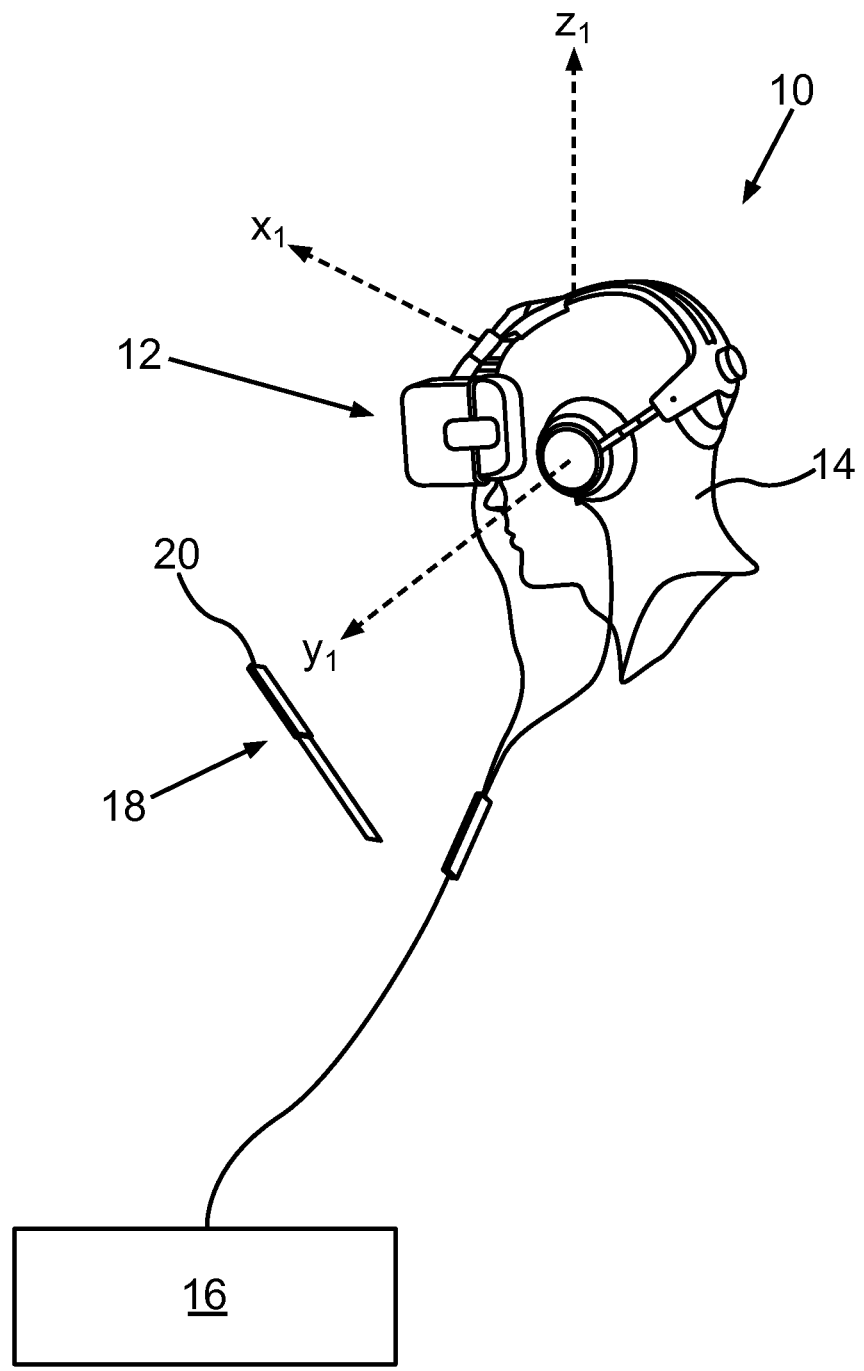
FIG. 1 shows a schematic illustration of a system for displaying virtual surroundings, wherein the system comprises virtual reality spectacles worn by a user, a control device for controlling the virtual reality spectacles and a remote control for controlling the image contents displayed by the virtual reality spectacles.

Reference will now be made in detail to the preferred embodiments of the present invention, examples of which are illustrated in the accompanying drawings, wherein like reference numerals refer to like elements throughout.

A system—denoted as a whole by 10—for displaying virtual surroundings is shown in FIG. 1. The system 10 comprises virtual reality spectacles 12 that are designed to display virtual surroundings and also one or more virtual objects within the virtual surroundings. By way of example, the virtual reality spectacles 12 may have two individual displays that are arranged in front of respective eyes of a wearer 14 of the virtual reality spectacles 12, so that the two displays can be used to bring about a three-dimensional effect for the wearer 14 when the virtual surroundings are displayed.

In addition, the virtual reality spectacles 12 may have a combination of a three-axis gyrometer and acceleration sensors that can be used to sense particularly swivel movements of the head of the wearer 14 about respective spatial axes $x_1$, $y_2$ and $z_1$. This allows a respective virtual angle of vision of the wearer 14, from which one or more virtual objects are displayed within the virtual surroundings, to be altered from respective observation positions within the virtual surroundings on the basis of a sensed swiveled position of the head of the wearer 14 of the virtual reality spectacles 12.

The system 10 additionally comprises a control device 16 that is coupled to the virtual reality spectacles 12 for the purpose of information interchange. By way of example, the control device 16 may be a computer having a piece of software installed thereon as appropriate, so that the control device 16 can control the display of the virtual surroundings by the virtual reality spectacles 12.

Furthermore, the system 10 also has a remote control 18 that is coupled both to the virtual reality spectacles 12 and to the control device 16, preferably via a radio link, for the purpose of information interchange. The remote control 18 can be used by the wearer 14, for example by operating a key 20 on the remote control 18, to control the virtual reality spectacles 12 in order to alter displayed virtual contents as appropriate.

Figure 2:
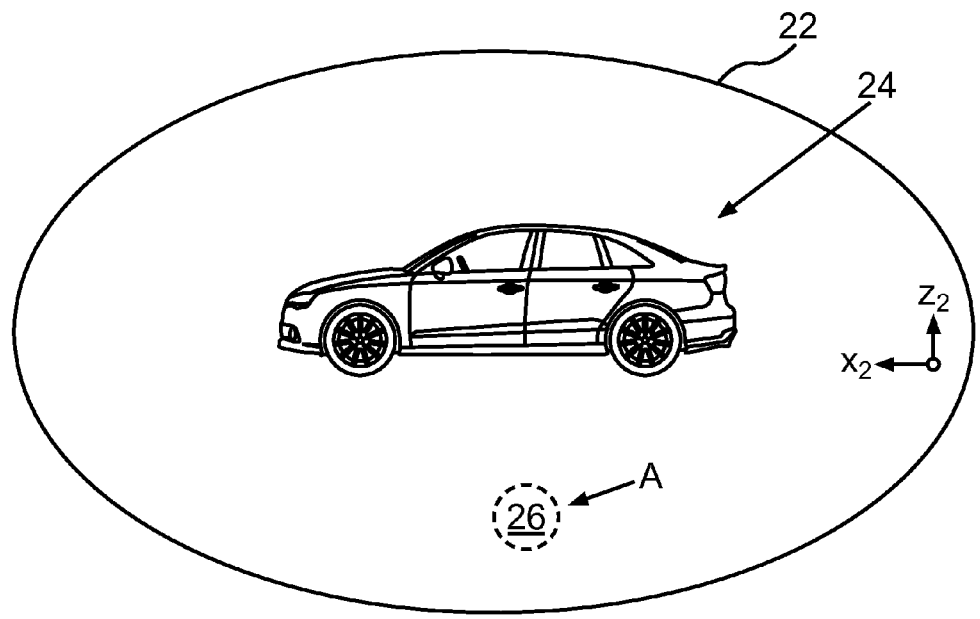
FIG. 2 shows a schematic illustration of virtual surroundings within which a virtual motor vehicle is displayed to the wearer of the virtual reality spectacles from a first virtual observation position.

FIG. 2 shows virtual surroundings 22, with a virtual motor vehicle 24 being displayed within the virtual surroundings 22 by the virtual reality spectacles 12. Corresponding coordinate axes within the virtual surroundings 22 are denoted by $x_2$ and $z_2$ and also by $y_2$. The letter A denotes a first observation position, that is to say a type of virtual viewpoint, within the virtual surroundings 22, from which the wearer 14 is currently looking at the motor vehicle 24.

The circle 26 shown in a dashed line is a position symbol that is arranged at the first virtual observation position. Preferably, the position symbol 26 is not displayed within the virtual surroundings 22 at all in the view shown here. In the present case, the position symbol 26 is shown only to improve understanding of the explanations below.

Figure 3:
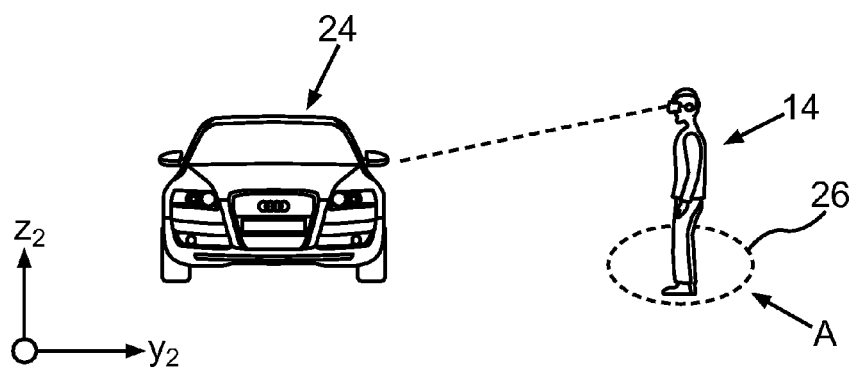
FIG. 3 shows a schematic illustration in which the virtual observation position of the wearer of the virtual reality spectacles with respect to the virtual motor vehicle, as shown in FIG. 2, is displayed.

FIG. 3 shows a schematic illustration of the virtual observation position A of the wearer 14 together with the position symbol 26 in a side view. According to the illustration shown in FIG. 2, the wearer 14 of the virtual reality spectacles 12 is thus virtually standing next to the motor vehicle 24 and is looking at the motor vehicle 24 from the side. By swiveling his head, the wearer 14 can alter a respective virtual angle of vision from which the motor vehicle 24 is displayed from the observation position 26. In this case, the virtual viewpoint of the wearer 14 remains unchanged; the wearer 14 can alter a respective angle of vision with respect to the motor vehicle 24 only by swiveling his head left and right or up and down.

If the wearer 14 of the virtual reality spectacles 12 wishes to alter his observation position A in order to view the motor vehicle 24 from a different virtual position, for example from the front or from behind, he merely needs to touch the key 20 on the remote control 18. This activates a type of movement or skip mode.

Figure 4:
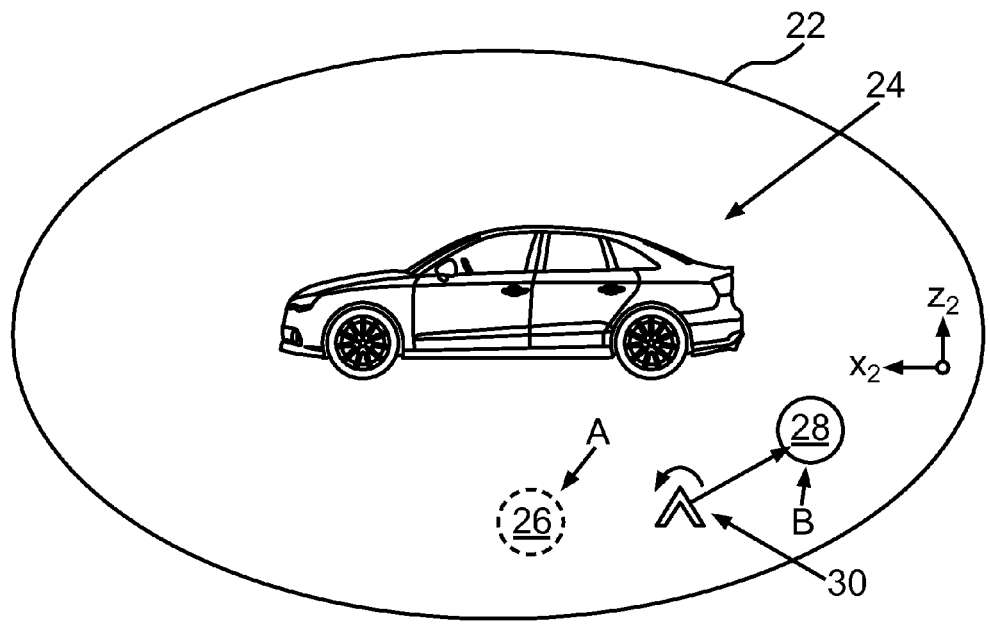
FIG. 4 again shows the virtual motor vehicle within the virtual surroundings, wherein additionally a selection symbol in a form like an arrow head and a position symbol represented as a circle in a solid line are shown.

As FIG. 4 shows, a position symbol 28 and a selection symbol 30 are then displayed within the virtual surroundings 22. The position symbol 28, displayed here in the form of a circular mark on the virtual ground of the virtual surroundings 22, is displayed at a position within the virtual surroundings 22 that corresponds to a second observation position B prescribed within the virtual surroundings 22, that is to say a further virtual viewpoint. In this case, the arrowhead-like selection symbol 30 is moved within the virtual surroundings 22 on the basis of a sensed head movement by the wearer 14 of the virtual reality spectacles 12. Alternatively or in addition, provision may also be made for the selection symbol 30 to be moved within the virtual surroundings 22 on the basis of a sensed eye movement by the wearer 14.

Should the wearer 14 of the virtual reality spectacles 12 now wish to be able to look at the motor vehicle 24 from the further observation position B, he merely needs to make the selection symbol 30 overlap the position symbol 28 in part or in full by an appropriate head and/or eye movement.

Figure 5:
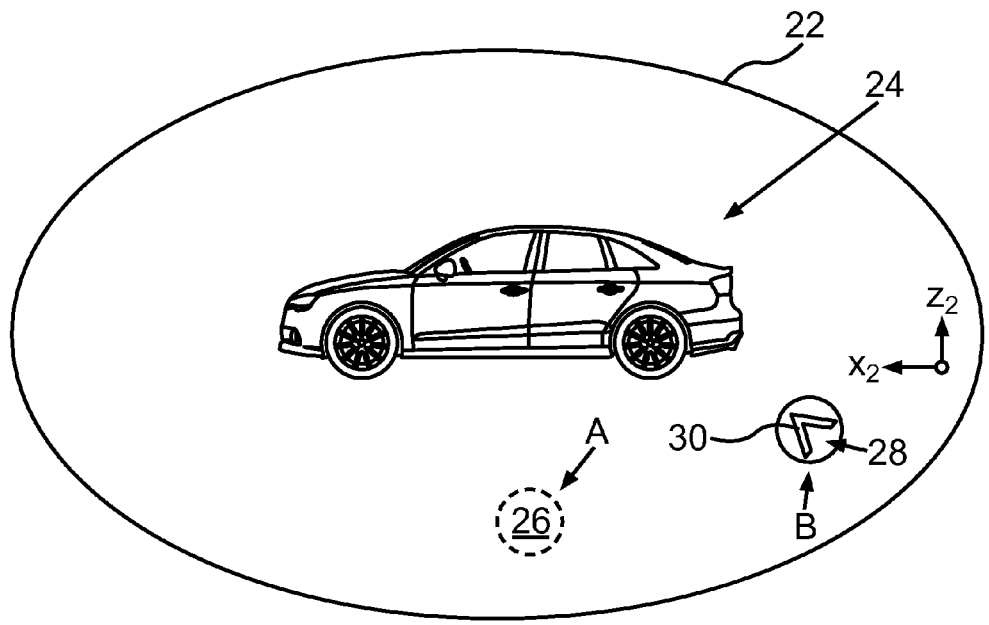
FIG. 5 shows substantially the same illustration as FIG. 4, wherein the selection symbol has been made to overlap the circular position symbol.

As soon as the selection symbol 30 has been made to overlap the position symbol 28, as shown in FIG. 5, the controller 16 registers that the position symbol 28 has been selected. In other words, it registers that the wearer 14 might wish to alter his virtual observation position, since he has moved the selection symbol 30 over the position symbol 28. Preferably, appropriate visual feedback can be displayed as soon as the position symbol 28 has been selected. By way of example, the color of the position symbol 28 and/or of the selection symbol 30 can also be altered, so that the wearer 14 is provided with visual feedback about the selection of the position symbol 28 in a simple manner.

In this case, the selection symbol 30 in arrowhead-like form is swiveled anticlockwise as soon as it has been made to overlap the position symbol 28. This identifies a virtual standard line of vision to the virtual motor vehicle 24 from the second observation position B. On the basis of the orientation of the selection symbol 30, the wearer 14 of the virtual reality spectacles 12 thus recognizes the line of vision with which he will look at the virtual motor vehicle 24 as soon as he has changed his position from the observation position A to the observation position B. In this case, the standard line of vision corresponds to the line of vision with which the virtual motor vehicle 24 is displayed if the wearer 14 of the virtual reality spectacles 12 keeps his head straight. In this context, "straight" means that he has swiveled his head neither left nor right and also neither up nor down. In this case, the virtual standard line of vision to the virtual motor vehicle 24 from the second observation position B is identified in the plane defined by the longitudinal direction $x_2$ and the transverse direction $y_2$ of the virtual surroundings 22. The wearer 14 of the virtual reality spectacles 12 is thus provided with a piece of two-dimensional directional information that identifies a standard line of vision from the second observation position B.

Should the wearer 14 of the virtual reality spectacles 12 now actually wish to change his virtual observation position from the observation position A to the observation position B, he merely needs to press the key 20 on the remote control 18. By way of example, the key 20 may have an appropriate key travel with a stop, the change of position from the virtual observation position 26 to the virtual observation position 28 being confirmed only when the key has been depressed by the wearer 14 as far as its stop, for example.

Figure 6:
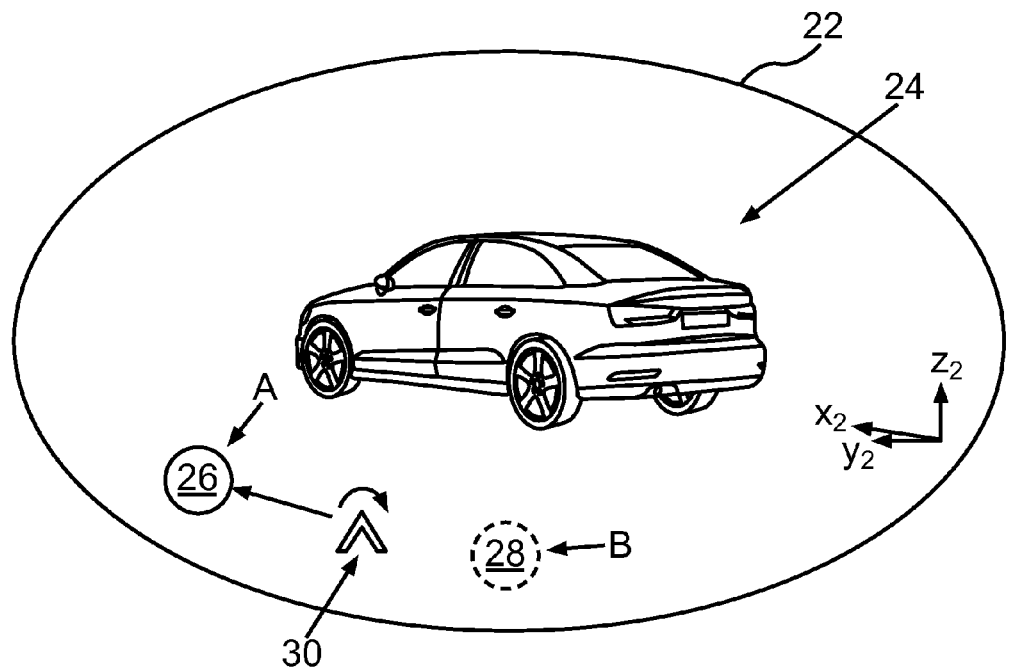
FIG. 6 shows a further illustration of the virtual surroundings, wherein the virtual motor vehicle is now displayed from a second virtual observation position.

FIG. 6 shows the motor vehicle 24 from the observation position B that has been virtually adopted at present after a virtual change of position from the observation position A to the observation position B has been made. The wearer 14 of the virtual reality spectacles 12 thus does not move continuously around the motor vehicle 24 in order to get from the observation position A to the observation position B. Instead, the wearer 14 skips virtually from the observation position A to the observation position B shown in FIG. 6 as soon as he has confirmed the change of position by pressing the key 20 on the remote control 18 after he has made the selection symbol 30 overlap the position symbol 28.

The position symbol 28 is subsequently shown only in a dashed line, and preferably, following the change of position, it is no longer displayed at all and is depicted in this case only to improve understanding. Should the wearer 14 still keep his thumb on the key 20, that is to say still touch it, for example, after the sudden change of position, the selection symbol 30 and the position symbol 26 continue to be displayed. As soon as the wearer 14 releases the key 20 on the remote control 18, that is to say no longer touches it at all, the position symbol 26 and the selection symbol 30 are hidden.

In the present case, the wearer 14 can look at the motor vehicle 24 diagonally from the side at the rear from the observation position B, and in this case too, the angle of vision with respect to the motor vehicle 24 is altered on the basis of sensed swivel movements of the head of the wearer 14, the observation position remaining firmly at the observation position B.

Should the wearer 14 again desire a change of position, he can again activate the movement or skip mode by touching the key 20 on the remote control 18, which again shows the selection symbol 30 and the position symbol 26. As soon as the wearer 14 has made the selection symbol 30 overlap the position symbol 26 by an appropriate head or eye movement, said position symbol is selected. As soon as the wearer 14 then presses the key 20, a virtual change of position is again carried out from the observation position B to the observation position A, as a result of which the wearer 14 of the virtual reality spectacles 12 again looks at the motor vehicle 24 purely from the side, as shown in FIGS. 2, 4 and 5.

In the case of a change of position from the observation position B to the observation position A too, the virtual standard line of vision from the first position A to the virtual motor vehicle 24 is identified in a similar manner to the procedure already explained by virtue of the selection symbol 30 being swiveled clockwise in the present case as soon as said selection symbol has been made to overlap the position symbol 26.

Apart from at the observation positions A and B, it is also possible for further position symbols, not shown here, to be shown within the virtual surroundings 22, so that the wearer 14 of the virtual reality spectacles 12 can change his virtual observation position within the virtual surroundings 22 in a similar manner to the procedure already described. Such position symbols can be displayed firstly in a distributed arrangement around the motor vehicle 24 and also in a distributed arrangement inside the motor vehicle 24. The wearer 14 of the virtual reality spectacles 12 can therefore not only virtually skip from one observation position to the next, which is situated outside the motor vehicle 24, but can also relocate his virtual observation position into the motor vehicle 24, for example into the driver's seat of the motor vehicle 24.

The wearer 14 of the virtual reality spectacles 12 therefore does not move around the displayed motor vehicle 24 continuously; instead, he skips from one virtual observation position to the next within the virtual surroundings 22 in order to change his angle of vision or his perspective with respect to the displayed motor vehicle 24.

Figure 7:
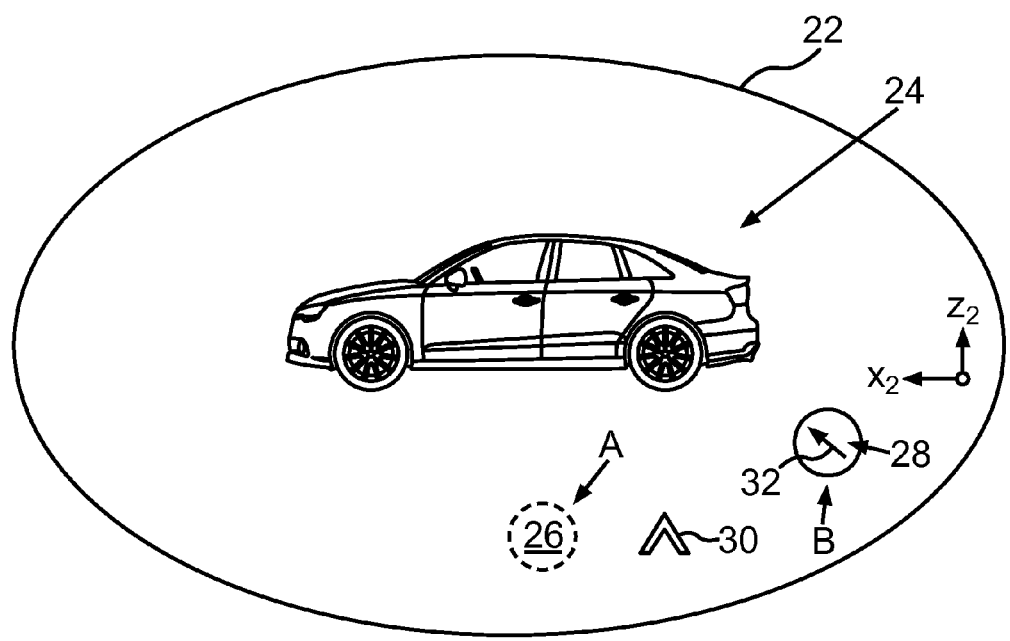
FIG. 7 shows substantially the same illustration as FIG. 1, wherein the position symbol has a direction sign that is directed at the virtual motor vehicle from the second observation position.

FIG. 7 shows substantially the same situation as FIG. 1, the position symbol 28 in the present situation having a direction sign 32. In the present case, the standard line of vision from the second observation position B to the virtual motor vehicle 24 is identified by virtue of the direction sign 32 of the position symbol 28 being oriented from the second observation position B to the virtual motor vehicle 24. In this case, provision may be made for the direction sign 32 to be displayed only when the position symbol 28 has been selected, for example by virtue of the selection symbol 30 again having been made to overlap the position symbol 28. Alternatively it is also possible for the direction sign 32 always to be displayed together with the position symbol 28. This has the advantage that the wearer 14 of the virtual reality spectacles 12 can—particularly if a large number of further position symbols are displayed that likewise have the direction sign 32—directly recognize how the respective standard line of vision from the respective position symbols will be.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2D 1865 (Fed. Cir. 2004).

The invention claimed is:

1. A method for operating virtual reality spectacles, comprising:
    displaying a virtual object using the virtual reality spectacles, the virtual object being displayed in virtual surroundings, the virtual object being displayed for viewing from a first observation position within the virtual surroundings;
    displaying a position symbol at a position within the virtual surroundings that corresponds to a second observation position within the virtual surroundings;
    displaying an identification of a virtual standard line of vision to the virtual object from the second observation position;
    selecting the position symbol as soon as a predetermined selection action has been sensed; and
    displaying the virtual object for viewing from the second observation position after the position symbol has been selected, wherein
    the position symbol is positioned so that, after the position symbol has been selected, a wearer of the virtual reality spectacles is given an impression that the wearer is situated in the virtual surroundings at the position of the position symbol.

2. The method according to claim 1, wherein displaying the virtual object for viewing from the second observation position comprises:
    sensing a predetermined user input confirmation action after the position symbol has been selected; and
    displaying the virtual object for viewing from the second observation position as soon as the confirmation action has been sensed.

3. The method according to claim 2, wherein the confirmation action is sensed when a wearer of the virtual reality spectacles activates a key on a remote control.

4. The method according to claim 1, wherein
    the predetermined selection action is that a selection symbol displayed within the virtual surroundings has been made to at least partially overlap the position symbol.

5. The method according to claim 4, wherein
    the selection symbol is moved within the virtual surroundings based on a sensed head movement by a wearer of the virtual reality spectacles.

6. The method according to claim 4, wherein
    the selection symbol is moved within the virtual surroundings based on a sensed eye movement by a wearer of the virtual reality spectacles.

7. The method according to claim 4, wherein
    displaying the identification of the virtual standard line of vision to the virtual object from the second observation position comprises displaying a direction sign associated with the selection symbol as soon as the selection symbol has been made to at least partially overlap the position symbol, the direction sign being oriented from the second observation position to the virtual object.

8. The method according to claim 1, wherein
    the position symbol has a direction sign that is oriented from the second observation position to the virtual object, and
    displaying the identification of the virtual standard line of vision to the virtual object from the second observation position comprises displaying the direction sign of the position symbol.

9. The method according to claim 8, wherein
    the direction sign is displayed only after the position symbol has been selected.

10. The method according to claim 8, wherein
    the direction sign is always displayed together with the position symbol.

11. The method according to claim 1, wherein
    the identification of the virtual standard line of vision to the virtual object from the second observation position, is displayed in a plane defined by a longitudinal direction and a transverse direction of the virtual surroundings.

12. The method according to claim 1, wherein
    the method further comprises sensing a head movement of a wearer of the virtual reality spectacles,
    the virtual standard line of vision to the virtual object from the second position is changed to an adapted virtual line of vision along which the virtual object is viewed, the virtual standard line of vision being changed when the head movement of the wearer of the virtual reality spectacles is sensed, and
    the adapted virtual line of vision is moved based on a currently-sensed swiveled position of the head of the wearer of the virtual reality spectacles.

13. The method according to claim 12, wherein
    the adapted virtual line of vision matches the virtual standard line of vision if the swiveled position of the head corresponds to a prescribed standard swiveled position.

14. The method according to claim 1, wherein
    the virtual object is a motor vehicle.

15. The method according to claim 14, wherein
    the position symbol is arranged and displayed outside or inside the motor vehicle.

16. The method according to claim 15, wherein
    a plurality of position symbols are provided respectively at a plurality of predefined observation positions within the virtual surroundings, and
    at least one position symbol is provided inside the motor vehicle.

17. The method according to claim 1, wherein the first and second observation positions are at predefined locations within the virtual surroundings.

18. The method according to claim 17, wherein a plurality of second observation positions are defined within the virtual surroundings.

19. The method as claimed in claim 1, wherein in an eye-scan-mode of operation, eye or head movements of a wearer of virtual reality spectacles are used to deviate from the virtual standard line of vision to the virtual object so that the wearer of the virtual reality spectacles views the virtual object along an adapted virtual line of vision based on a currently-sensed head position or eye position, the predetermined selection action is that a selection symbol displayed within the virtual surroundings has been made to at least partially overlap the position symbol, and in a viewing-position-skip-mode of operation, head or eye movements of the wearer of the virtual reality spectacles are used to move the selection symbol within the virtual surroundings.

20. The method according to claim 19, wherein the viewing-position-skip-mode is activated when a key on a remote control is activated.

21. The method as claimed in claim 19, wherein the selection symbol and the position symbol are displayed only in the viewing-position-skip-mode.

22. The method as claimed in claim 1, wherein the identification of the virtual standard line of vision to the virtual object, is displayed after the position symbol has been selected and before the virtual object is displayed for viewing from the second observation position.

23. A system comprising:
virtual reality spectacles
    to display a virtual object arranged in virtual surroundings, the virtual object being displayed for viewing from a first observation position prescribed within the virtual surroundings;
    to display a position symbol at a position within the virtual surroundings that corresponds to a second observation position within the virtual surroundings; and
    to display an identification of a standard line of vision to the virtual object from the second observation position; and
a control device
    to select the position symbol as soon as a predetermined selection action has been sensed;
    to actuate the virtual reality spectacles such that the virtual object is displayed for viewing from the second observation position after the position symbol has been selected, wherein
the position symbol is positioned so that, after the position symbol has been selected, a wearer of the virtual reality spectacles is given an impression that the wearer is situated in the virtual surroundings at the position of the position symbol.

24. The method according to claim 1, wherein the virtual reality spectacles skip from the first observation position to the second observation position to thereby avoid a continual virtual movement around the virtual object from the first observation position to the second observation position.

* * * * *